Aug. 19, 1958  R. F. PFENNIG  2,848,515
PURIFICATION OF PARAXYLENE
Filed Feb. 16, 1952  5 Sheets-Sheet 1

INVENTOR.
Reuben F. Pfennig,
BY
ATTORNEY.

INVENTOR.
Reuben F. Pfennig,
BY

SOLUBILITY OF PARA-, ORTHO-, AND METAXYLENE IN IDEAL SOLUTIONS

Aug. 19, 1958 R. F. PFENNIG 2,848,515
PURIFICATION OF PARAXYLENE
Filed Feb. 16, 1952 5 Sheets-Sheet 4

EFFECT OF HOLDING TIME ON PARAXYLENE RECOVERY.

INVENTOR.
Reuben F. Pfennig,
BY
ATTORNEY.

United States Patent Office 2,848,515
Patented Aug. 19, 1958

2,848,515

PURIFICATION OF PARAXYLENE

Reuben F. Pfennig, Baytown, Tex., assignor, by mesne assignments, to Esso Research and Engineering Company, Elizabeth, N. J., a corporation of Delaware Application February 16, 1952, Serial No. 271,895

8 Claims. (Cl. 260—674)

This application is a continuation-in-part of Serial No. 168,581, filed June 16, 1951, and now abandoned.

The present application is directed to a process for recovering high purity paraxylene from a mixture containing paraxylene and at least one other isomeric xylene. Processes are known for obtaining a mixture of xylenes. For example, in the petroleum refining art it is possible by subjecting fractions to hydroforming and then to distillation to obtain a mixture of isomeric xylenes in which the paraxylene is present in an amount within the range of about 15 to 25% by volume. Heretofore there has not been available to the art an efficient crystallization procedure for recovering paraxylenes in such substantially pure form from a feed stock containing such low concentrations of paraxylenes.

It is an object of the present invention to provide an improved procedure for separating a high concentration paraxylene product from a feed stock having isomeric xylenes with paraxylene present in an amount within the range of 15 to 25% by volume.

Briefly, in the process of the present invention a feed stock containing paraxylene in an amount within the range of about 15 to 25% by volume contaminated by at least one other isomeric xylene is subjected to a first crystallization step to form a first slurry of paraxylene crystals in mother liquor, the paraxylene crystals in this first slurry having a needle-like shape and a typical size of 10 x 100 microns when viewed in a microscope. This first slurry is sent to a first separation step where there is separated therefrom a first cake consisting of from 65 to 85% by weight of paraxylene. The first cake is melted to form a melt and the resultant melt then subjected to a second crystallization step to form a second slurry of paraxylene crystals in mother liquor. Paraxylene crystals in the second slurry have a plate-like rectangular shape with a typical size of 90 x 270 microns when viewed in a microscope. To this second slurry may optionally be admixed mother liquor from the subsequent second separation step but in any event a slurry comprising principally of said crystals and mother liquor from said second crystallization step has separated therefrom in a second separation step a second cake containing paraxylene with a purity in excess of 90% by weight. This cake may be recovered as substantially pure paraxylene. The mother liquor from the second separating step contains appreciable amounts of paraxylene and may be recycled either to the first chilling step or may be divided into two portions; the first portion being admixed with the slurry from the second crystallization step to improve its fluidity while the remainder is recycled to the feed prior to the first chilling step. In this manner substantially all the paraxylene from the feed stock may be recovered as substantially pure paraxylene.

The invention will be further described by reference to the drawing in which

Figure 3:
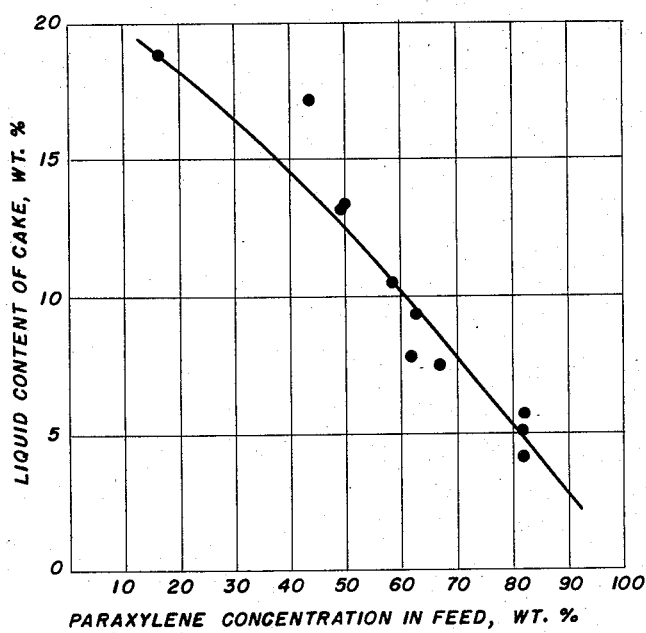
Figure 4:
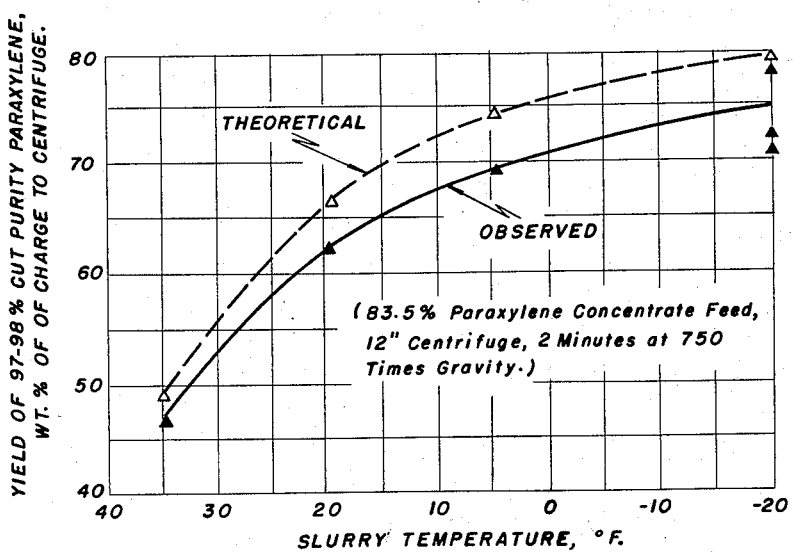

Fig. 3 presents a plot of data in which the liquid content of the filter cake in weight percent is plotted against the paraxylene concentration in the feed;

Fig. 4 is a plot of data showing the relationship between the yield of pure paraxylene and the slurry temperature in degrees Fahrenheit for the second stage of the process.

Figure 5:
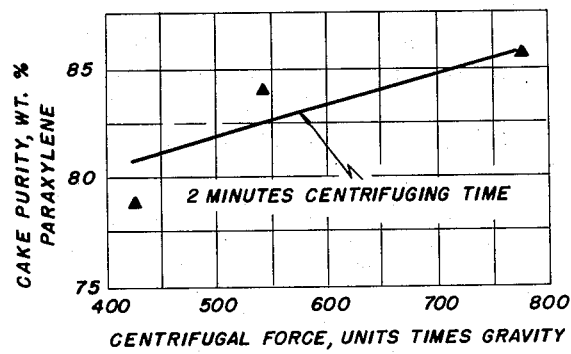
Figure 6:
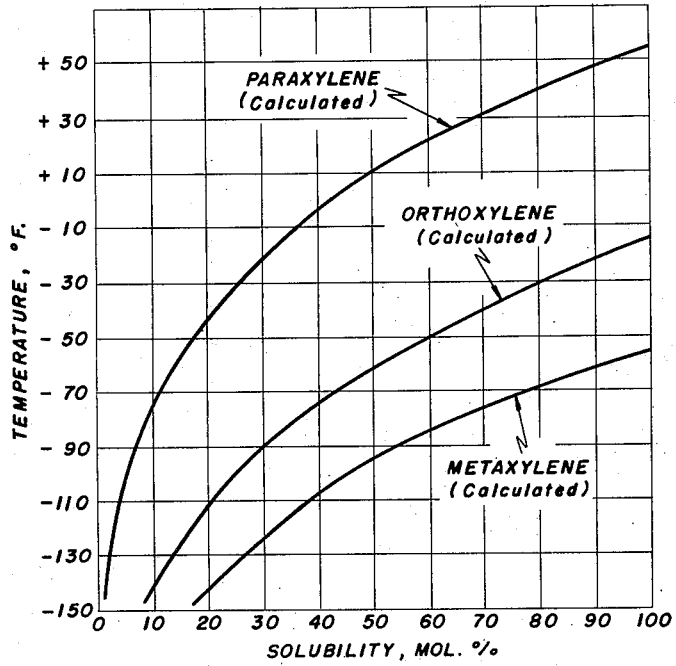
Figure 7:
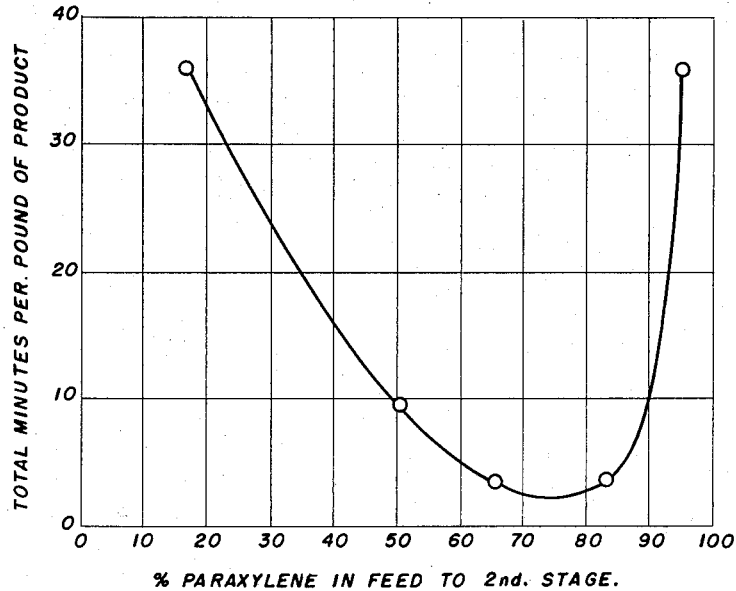
Figure 8:
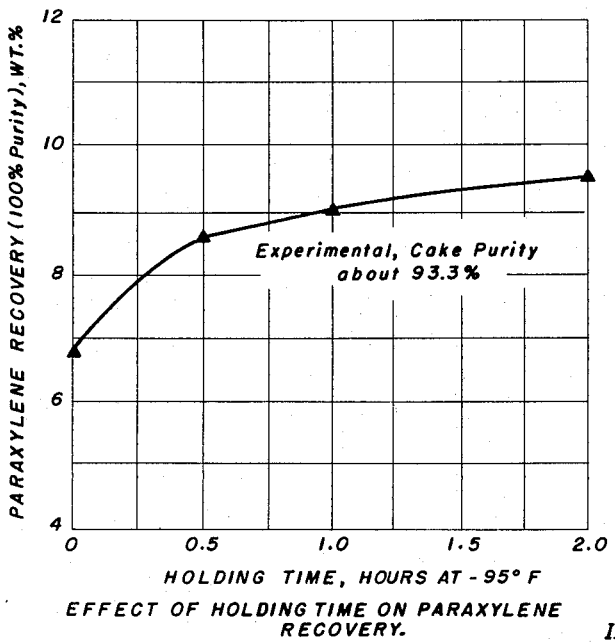
Figure 9:
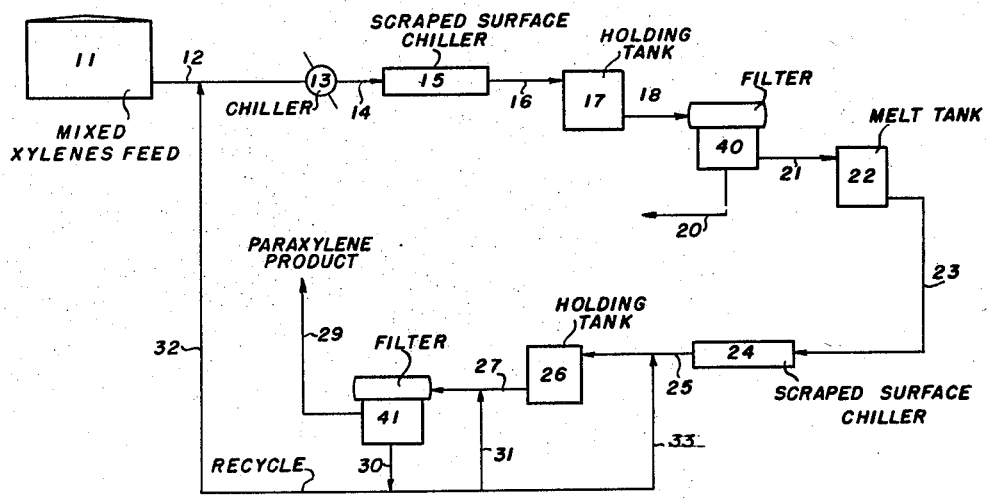
Figure 10:
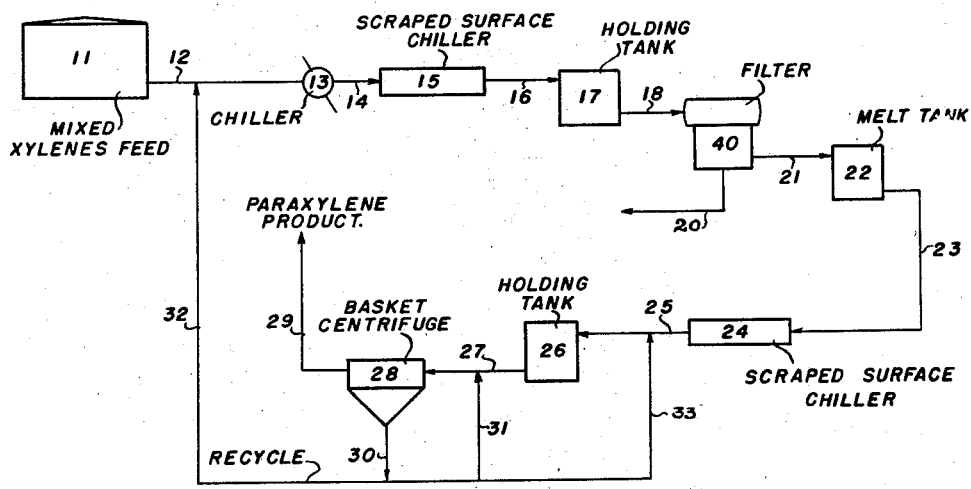

Fig. 5 is a graph of data showing the relationship between the purity of the cake in weight percent of paraxylene and the centrifugal force in units times gravity;

Fig. 6 is a graph showing the solubility of each xylene isomer in ideal solution as a function of temperature;

Fig. 7 is a graph showing the relationship between the number of minutes of centrifuging per pound of substantially pure paraxylene concentrate and the percentage of the paraxylenes in the feed to the second stage of the process;

Fig. 8 is in the form of a graph showing the relationship between the amount of paraxylene recovered in weight percent and the time the feed is held at the crystallization temperature;

Fig. 9 is a flow diagram showing another mode for carrying out the invention; and Fig. 10 is a flow diagram showing still another mode for carrying out the invention.

Referring now specifically to the drawing, numeral 11 designates a charge tank containing a feed stock consisting of a liquid mixture of hydrocarbons which may contain ethylbenzene, paraxylene, metaxylene, and orthoxylene. An analysis of a typical feed stock for the process of the present invention is given in the following table:

TABLE I

| Component: | Volume percent by infrared analysis |
|---|---|
| Toluene | 2.0 |
| Ethylbenzene | 19.2 |
| Paraxylene | 15.7 |
| Metaxylene | 42.2 |
| Orthoxylene | 20.9 |

The feed stock from tank 11 is subjected to a first crystallization step where crystals of paraxylene are formed prior to a first separation step. In the drawing crystals are formed in scraped surface chiller 15 and holding tank 17. Usually it is desirable to chill preliminarily the feed stock at a temperature somewhat above the crystallization temperature. Thus, from tank 11 the feed stock passes through line 12 to a preliminary chiller 13, then passed through line 14 to scraped surface chiller where it is chilled to form crystals of paraxylene and then passed through line 16 to holding tank 17. The slurry formed in the first crystallization zone will hereinafter be designated the first slurry for convenience. The first slurry is passed from holding tank 17 through line 18 to a suitable separating device such as basket centrifuge 19.

Preliminary chiller 13 chills the mixture to a temperature above its crystallization point, for example, −40° F. Scraped surface chiller 15 may be operated at a temperature within the range of −90° and −110° F. A temperature of −100° F. gives good results. Usually, the mixture will warm up slightly in holding tank 17 so that the outlet of chiller 15 may be 5 or 6° F. lower than the temperature of the holding tank.

The feed stock should be retained in the first crystallization zone at a temperature below the crystallization point for the paraxylene for at least 30 minutes to insure satisfactory crystal growth. Satisfactory time ranges for holding the feed below the paraxylene crystallization temperature are between 30 minutes and 2 hours. As stated heretofore, the first crystallization zone includes both the scraped surface chiller 15 and holding tank 17. By maintaining the mixtures within the first crystallization zone for a time and at a temperature within the ranges indicated, the paraxylene is crystallized to form needle-like crystals having a typical crystal size of 10 x 100 microns when viewed in a microscope.

The first slurry formed in the first crystallization zone is sent to the first separation stage which is illustrated as carried out in centrifuge 19 which may be of the basket type well known to the art. This centrifuge may operate at a rate in the range from 400 to 1000 times gravity. Good results may be obtained at around 750 times gravity. The chilled mixture introduced by line 18 comprises a slurry of paraxylene crystals in a mother liquor. This slurry is separated, in basket centrifuge 19, into mother liquor and filter cake, the filtrate or mother liquor being discharged from the centrifuge 19 by line 20 for further use as may be desired, while the filter cake of crystals is removed by line 21 and discharged into a melt tank 22. This melt tank 22 may be provided with suitable heating equipment to heat the crystals to a temperature of about 50° F. The melt from tank 22 is sent to a second crystallization step carried out in scraped surface chiller 24 and holding tank 26 to form a second slurry. The melt from tank 22 passes through line 23 to scraped surface chiller 24 and then through line 25 to holding tank 26.

Scraped surface chiller 24 and holding tank 26 form the second crystallization zone. It is desirable for the mixture to be maintained at a temperature within a range of +20° F. to −20° F. in the second crystallization zone for a time within the range of 30 minutes to 2 hours. For example, satisfactory results will be obtained by holding the slurry at a temperature of −20° F. for 30 minutes. Maintaining the melt within the second crystallization zone for a time and at a temperature within the ranges indicated causes a slurry, hereinafter designated the second slurry, to be formed which contains paraxylene crystals having a plate-like rectangular shape with a typical size of 90 x 270 microns when viewed in a microscope.

The second slurry consisting of paraxylene crystals having a plate-like rectangular shape and a typical crystal size of 90 x 270 microns suspended in a mother liquor may be diluted with mother liquor from line 31 in order to increase its fluidity before it is sent to the second separation stage 28.

In the drawing the second separation stage is illustrated as carried out in centrifuge 28 which may be of the same basket type and may operate in the same range as centrifuge 19, heretofore described. Thus, centrifuge 28 separates paraxylene crystals from a mother liquor. The paraxylene crystals obtained in the second separation stage 28 have a purity above 90% paraxylene and usually above 95% paraxylene. These crystals are discharged from centrifuge 28 through line 29 and may subsequently be melted for recovery of the paraxylene as a liquid.

The mother liquor from centrifuge 28 is discharged therefrom through line 30 which connects into recycle lines 31 and 32 wherein the mother liquor is divided into two portions. The first portion is recycled either by line 31 to the second slurry withdrawn from holding tank 26 or to the slurry withdrawn from scraped surface chiller 24 in line 25 by means of line 33 or a part may be discharged through line 31 and part through line 33. In any event the slurry is recycled in an amount sufficient to insure the fluidity of the slurry in the second chilling zone. The second portion of mother liquor from centrifuge 28 is recycled ahead of first chiller 13 by line 32. By utilizing the operation described, high yields of paraxylene of high purity are obtained.

For example, a feed stock in tank 11 comprising one hundred volumes of a paraxylene mixture with the other isomeric xylenes and ethyl benzene and containing 17% by volume of paraxylene may be crystallized at a temperature of −100° F. and then centrifuged for two minutes at a rate of 750 times gravity in centrifuge 19 wherein a filtrate or mother liquor comprising 90 volumes is separated. This mother liquor would have a paraxylene content of 8%. The crystals, of 84% paraxylene purity, are discharged from centrifuge 19 by line 21 into tank 22 and heated to a temperature of 50° F. and then crystallized at a temperature of −20° F. This slurry of paraxylene is discharged into centrifuge 28 also operated at about 750 times gravity and centrifuged for two minutes. A paraxylene product amounting to 8½ volumes of 97% purity is recovered by line 29. The filtrate from centrifuge 28 is divided into two portions, one portion comprising six volumes and the second portion comprising two volumes. The first portion comprising six volumes is recycled to the slurry being withdrawn by line 27 from the holding tank 26 while the second portion comprising 2 volumes is recycled to the feed stock being introduced through line 12 to chiller 13. The filtrate from line 30 which is divided into two portions contains 33% paraxylene.

It will be seen from the foregoing description taken with the drawing that substantially pure paraxylene may be recovered from a mixture of it by a simple commercially adaptable process.

The crystallization temperature employed in the first stage of crystallization is a function of the composition of the feed. It is desired to obtain the maximum precipitation of paraxylene crystals without precipitation of other contaminating crystals. This is achieved by holding the mixture at a temperature below the crystallization temperature of the paraxylene and just above the eutectic point of the paraxylene with the next most easily precipitated component.

Fig. 6 shows a plot of the temperature variation of the solubility of the three xylenes in ideal solution. For an example of its application, assume a feed contains 20 mol percent paraxylene, 50 mol percent metaxylene, and 30 mol percent orthoxylene. From Fig. 6, it is seen that such a concentration of metaxylene is soluble at about −93° F., and the orthoxylene at −90° F. By a simple trial and error calculation it is then found from the chart that at a temperature of −82° F. paraxylene crystals may be separated until 65 percent of the amount originally present is recovered and the concentration of paraxylene in the residual liquor is eight mole percent. For a composition such as given in Table I, the temperature will be in the range between −90° and −110° F. Thus, the first stage of the present invention is carried out at a temperature about the first eutectic temperature of paraxylene and another constituent of the mixture, with the total time for centrifuging including filling and draining no greater than 10 minutes. Usually, a total centrifuging time no greater than 2 minutes is usually sufficient to obtain a concentrate for use as a feed to the second stage containing about 83% paraxylenes. In the second stage of the present operation in which primary concentrates from the first stage is melted and centrifuged at a higher temperature, the filtrate or mother liquor is returned for admixture with the charge to the first stage for further paraxylene removal.

In order to show the effect of varying the time of holding a xylenes mixture in the crystallization zone after the crystallization temperature had been reached on the amount of paraxylene recovered, several runs were made with the results tabulated in Table II. In making these runs a stock similar to that shown in Table I was used for the feed. The feed was chilled to −95° F. and held at this temperature for 0, ½, 1 and 2 hours before centrifuging 30 minutes at 750 times gravity in a 12 inch centrifuge. The yield of paraxylene recovered from these operations was plotted against the holding time in Fig. 8; it is seen that 26 and 40% increases in yield were achieved at holding the slurry .5 and 2 hours respectively after chilling to −95° F. The slope of the curve indicates that little additional yield is to be gained by holding the slurry over 2 hours at −95° F. The purity of these products from these slurries were the same after correcting to a constant 1½ cake thickness. While the concentration of feed stock and temperature of crystallization used in these experiments fall within the range of conditions of the first crystallization stage of the present process, it is similarly desirable to crystallize the second slurry at a crystallization temperature for a period within the range of 30 minutes to 2 hours in order to achieve the desired crystal growth which results in quick and easy separation of the crystals from the mother liquor and a high percentage recovery of paraxylene from the melt charged to the second crystallization step.

TABLE II

|  | Slurry Temperature, −95° F. | | | |
|---|---|---|---|---|
| Run | 1 | 2 | 3 | 4 |
| Holding Time, Hours | 0 | ½ | 1 | 2 |
| Yield of Paraxylene Concentrate (on Output Basis), Wt. Percent | 7.2 | 9.2 | 9.7 | 10.4 |
| Purity of Concentrate (Crystal Point Method), Wt. Percent | 94.6 | 93.6 | 93.0 | 91.8 |
| Purity of Concentrate, Corrected to Thickness, Wt. Percent | 93.4 | 93.1 | 93.5 | 93.2 |
| Yield or Paraxylene (100%), Wt. Percent | 6.8 | 8.6 | 9.0 | 9.5 |

In order to illustrate the effects of paraxylene concentration and slurry temperature on yield and purity in the second stage a number of runs were made in which concentrates containing varying percentages of paraxylene were subjected to an operation equivalent to that described in conjunction with the second stage of the drawing. In these runs the paraxylene concentrate was chilled to a temperature in the range from +35° F. to −95° F. and paraxylene concentrates containing from approximately 21% to approximately 78% paraxylene were employed. In these operations the concentrates where chilled to the various temperatures mentioned and subjected to centrifuging for two minutes at 750 times gravity. The results of these runs are presented in Table III.

where liquid content of cake, weight percent, is plotted against the paraxylene concentration in the feed, weight percent. From this curve it was found that under constant centrifuging conditions cakes produced from 85% paraxylene content feed stocks retained only about 25% of the volume of liquid held in the cakes produced from 15% feed. It is further observed that the average crystal size in the final slurry is large in comparison with the crystal size that was obtained in the first slurry thus exposing less crystal surface to contaminating liquid. It was observed that the crystals formed from the feed stock in the first crystallization stage were needle-shaped having a typical crystal size of 10 x 100 microns when viewed in the microscope whereas the crystals formed in the second chilling stage have a plate-like rectangular shape with a typical size of 90 x 270 microns when viewed in the microscope. In any event the slurry formed in the second crystallization stage forms a more porous cake which drains more readily in the centrifuge than does the cake formed in the first centrifuge. It was observed that the crystals found in the slurry in the first stage were almost exclusively very small which have a needle-like appearance when observed under a microscope. The size of a typical crystal from the first slurry is 10 x 100 microns. When observing the slurry from the second stage under a microscope it was found that there was a complete absence of the small crystals having 1 dimension of the order of 10 microns. The second stage crystals observed under the microscope have a plate-like shape, a typical crystal showing dimensions of 90 x 270 microns. A number of considerably larger crystals, for example, 260 x 450 microns were also observed in the slurry from the second stage.

In order to illustrate the effects of operating the centrifuge at various rates, runs were made in which a feed stock as shown in Table I was chilled indirectly to −95° F. to form a slurry which was held in a holding tank for 30 minutes. This slurry was then centrifuged for two minutes employing centrifugal forces ranging from 425 to 775 times gravity. The results of these runs are shown in Table IV and are plotted in Fig. 5. It will be apparent from these data that the centrifugal force employed does not have too great an effect on the cake purity in percentage of paraxylene. However, it will be preferred to use a centrifugal force in excess of 600 times gravity.

TABLE III

*B. Second stage*

| Concentration of Paraxylene in Feed, Wt. Percent | 83.5 | | | | 68.4 | 65.3 | 64.2 | 60.4 | 50.8 | 44.0 |
|---|---|---|---|---|---|---|---|---|---|---|
| Slurry Temperature, °F | 35 | 20 | 5 | −20 | 20 | −70 | 0 | −40 | −20 | −95 |
| Yield of Paraxylene Concentrate (Output Basis), Wt. Percent | 46.6 | 62.5 | 69.2 | 78.4 | 21.1 | 68.2 | 41.7 | 57.3 | 36.4 | 43.8 |
| Purity of Paraxylene Concentrate (Crystal Point Method), Wt. Percent | 98.4 | 97.7 | 98.0 | 97.1 | 97.3 | 91.1 | 95.3 | 91.8 | 91.1 | 88.8 |
| Yield of Paraxylene (100%), Wt. Percent | 45.7 | 61.0 | 67.8 | 76.0 | 20.5 | 62.2 | 39.7 | 52.5 | 33.2 | 38.8 |
| Paraxylene Content of Filtrate, Wt. Percent | 70.2 | 60.2 | 50.0 | 33.0 | 64.2 |  | 40.0 |  |  |  |
| Chilling time, Minutes | 25 | 55 | 140 | 40 | 25 | 65 | 25 | 30 | 15 | 95 |

Figure 2:
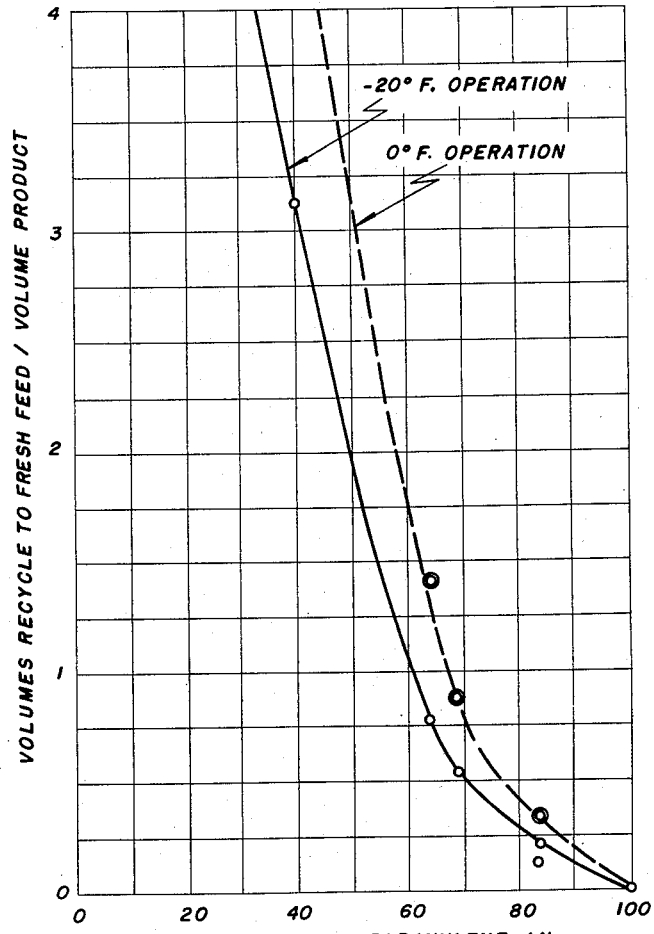
Fig. 2 is a plot of data in which the volume recycled to the fresh feed with respect to the volume of product is plotted against the concentration of paraxylene in the recrystallized feed.

It will be seen from examination of the data that the purity of concentrate from the second stage decreases with both decreasing feed concentration thereto and decreasing slurry temperatures. For a given purity the yield of concentrate drops as the feed concentration is reduced. With the decreasing yield, the recycling rate to the feed in the first stage increases as shown in Fig. 2.

By assuming that the contaminating liquid in the paraxylene is the same composition as the filtrate and from the data in Table III the liquid concentration of the cake from operations with various feeds may be determined. Such data were obtained and plotted in Fig. 3

TABLE IV

| Time, Minutes | 2 | | |
|---|---|---|---|
| Centrifugal Force, Units Times Gravity | 775 | 540 | 425 |
| Yield of Paraxylene Concentrate (Output Basis), Wt. Percent | 10.5 | 9.6 | 11.5 |
| Purity of Concentrate (Crystal Point Method), Wt. Percent | 84.4 | 84.1 | 77.9 |
| Yield of Paraxylene (100%), Wt. Percent | 8.9 | 8.1 | 8.9 |

In order to illustrate the effects of slurry temperature on the yield of 97% or 98% concentrate in the second stage of the process, the data from Table III were plotted to show the yield of this purity paraxylene in weight percent of charge with respect to the slurry temperature. These data are plotted and shown in Fig. 4.

The effect of varying the concentration of paraxylene in the feed to the second stage of my process is graphically represented in Fig. 7, which shows a plot of the total centrifuging time in the two stages, required to produce one pound of 95% purity paraxylene from a feed similar to that described in Table I, versus the concentration of paraxylene in the feed to the second stage. It is seen that thirty minutes total centrifuging time is required to produce 95% paraxylene from a 16% feed to the second stage. This is in effect a one stage operation, the time required being 0 minute in the first stage and 30 minutes in the second. On the other extreme, to produce a 95% purity feed to the second stage, 30 minutes centrifuging time is required in the first stage, and therefore no time is required in the second stage. The minimum total centrifuging time of about two minutes is required where the paraxylene concentration in the feed to the second stage is about 75 percent. The curve further shows that, where the concentration of paraxylene in the feed to the second stage is in the range between 65% and 85%, a 95% purity cake can be produced with a total centrifuging time, in the two stages, of less than ten minutes. Actually, under optimum conditions, a total centrifuging time no greater than 2 minutes for the first stage and 15 seconds for the second stage may be achieved.

Figure 1:
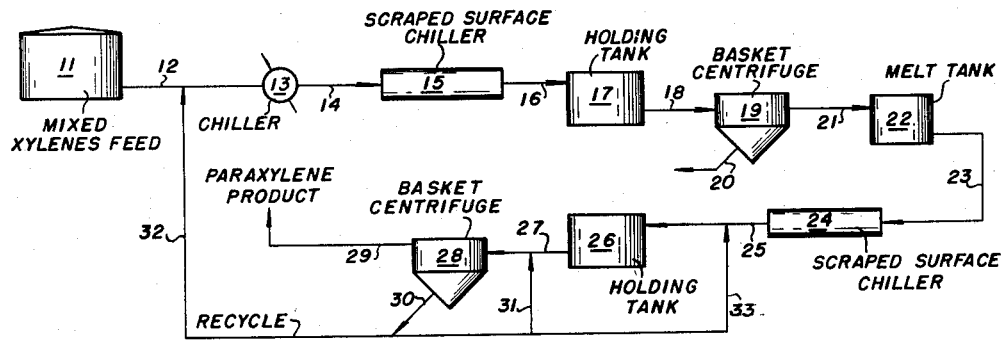
Fig. 1 is a flow diagram showing a preferred mode of carrying out the invention.

While the preferred procedure, as shown in Fig. 1 employs basket centrifuges for the operating step, it will be apparent that other separation devices may be used.

In Fig. 9 another flow sheet is shown in parts identical to those in Fig. 1 and are designated by identical numerals. The embodiment of Fig. 9 differs from that of Fig. 1 in having a filter 40 for carrying out the first separating step and a filter 41 for carrying out the second separating step instead of the basket centrifuges 19 and 28 shown in Fig. 1. Since the flow of the materials through the various parts of the process is identical to that of Fig. 1, the several steps of the process will not be again described in detail.

Fig. 10 shows another embodiment of the present invention in which the first separating step is carried out in filter 40 and the second step is carried out in basket centrifuge 28. Inasmuch as the mode of operation shown in this figure differs from that of Fig. 1 only in the separating steps used, the process here shown will not be described in further detail.

In will be appreciated that in addition to using the different types of separating means shown in Figs. 1, 9, and 10 of the drawing that types of chillers other than the scraped surface chillers shown may also be used.

The nature and objects of the present invention having been completely described and illustrated, what I wish to claim as new and useful and to secure by Letters Patent is:

1. A process for separating paraxylene of over 90% by weight purity from a feed stock consisting of a liquid mixture of aromatic hydrocarbons including paraxylene in the range from about 15 to 25% volume, the other isomeric xylenes including orthoxylene and ethyl benzene and containing no more than a small amount of other aromatic material, which comprises the steps of chilling said mixture and holding it at a temperature below the crystallization temperature of paraxylene and just above the eutectic point of paraxylene with the most easily precipitated component within the range of −90° and −110° F. for at least 30 minutes to form a first slurry of paraxylene crystals in a mother liquor with said crystals having a needle-like shape with a typical crystal size of 10 x 100 microns when viewed in a microscope, separating crystals from said first slurry to form a first cake having a total paraxylene content within the range of 65 to 85% by weight, melting said first cake to form a melt, chilling said melt and holding it at a temperature below the crystallization point of paraxylene within the range of −20° and 20° F. for at least 30 minutes to form a second slurry of paraxylene crystals in mother liquor, said paraxylene crystals having a plate-like rectangular shape with a typical crystal size of 90 x 270 microns when viewed in a microscope, subjecting slurry comprising said crystals in mother liquor to a separation step to form a second cake containing paraxylene having a purity in excess of 90% by weight and recovering said cake.

2. A process in accordance with claim 1 in which said first and second cakes are formed by filtering said first and second slurries.

3. A process in accordance with claim 1 in which said first and second cakes are formed by centrifuging said first and second slurries.

4. A process in accordance with claim 1 in which said first cake is formed by filtering said first slurry.

5. A process in accordance with claim 1 in which said first cake is formed by filtering said first slurry and said second cake is formed by centrifuging said second slurry.

6. A process for separating paraxylene of over 90% by weight purity from a feed stock consisting of a liquid mixture of aromatic hydrocarbons including paraxylene in the range from about 15 to 25% by volume, the other isomeric xylenes including orthoxylene and ethyl benzene and containing no more than a small amount of other aromatic material, which comprises the steps of chilling said mixture and holding it at a temperature below the crystallization temperature of paraxylene and just above the eutectic point of paraxylene with the next most easily precipitated component within the range of −90° and −110° F. for at least 30 minutes to form a first slurry of paraxylene crystals in a mother liquor with said crystals having a needle-like shape with a typical crystal size of 10 x 100 microns when viewed in a microscope, centrifuging said first slurry for a time no greater than two minutes to form a first cake comprising a total paraxylene content within the range of 65 to 85% by weight, melting said first cake to form a melt, chilling said melt and holding it at a temperature below the crystallization point of paraxylene within the range of −20° and 20° F. for at least 30 minutes to form a second slurry of paraxylene crystals in mother liquor, said paraxylene crystals having a plate-like rectangular shape with a typical crystal size of 90 x 270 microns when viewed in a microscope, and centrifuging slurry comprising said crystals in mother liquor for a time no greater than 2 minutes to form a second cake containing paraxylene having a purity in excess of 90% by weight and recovering said second cake.

7. A process for separating paraxylene of over 90% by weight purity from a feed stock consisting of a liquid mixture of aromatic hydrocarbons including paraxylene in the range from about 15 to 25% by volume, the other isomeric xylenes including orthoxylene and ethyl benzene and containing no more than a small amount of other aromatic material, which comprises the steps of chilling said mixture and holding it at a temperature below the crystallization temperature of paraxylene and just above the eutectic point of paraxylene with the next most easily precipitated component within the range of −90° and −110° F. for at least 30 minutes to form a first slurry of paraxylene crystals in a mother liquor with said crystals having a needle-like shape with a typical crystal size of 10 x 100 microns when viewed in a microscope, centrifuging said first slurry for a time no greater than 2 minutes to recover a first cake having a total paraxylene content within the range of 65 to 85% by weight, melting said first cake to form a melt, chilling said melt and holding it at a temperature below the crystallization point of paraxylene within the range of −20° and 20° F.

for at least 30 minutes to form a second slurry of paraxylene crystals in mother liquor, said paraxylene crystals having a plate-like rectangular shape with a typical crystal size of 90 x 270 microns when viewed in a microscope, centrifuging a slurry comprising said crystals in mother liquor for a time no greater than 2 minutes to form a second cake containing paraxylene having a purity in excess of 90% by weight and a mother liquor fraction, recovering said second cake and recycling a portion of said mother liquor fraction to the feed stock and another portion to said second slurry in an amount sufficient to insure its fluidity.

8. A method in accordance with claim 7 in which the portion of the mother liquor fraction added to said second slurry is greater than the portion of the mother liquor fraction added to the feed stock.

References Cited in the file of this patent

UNITED STATES PATENTS

| | | |
|---|---|---|
| 1,940,065 | Spannagel et al. | Dec. 19, 1933 |
| 2,398,526 | Greenburg | Apr. 16, 1946 |
| 2,511,711 | Hetzner et al. | June 13, 1950 |
| 2,533,232 | Dressler | Dec. 12, 1950 |
| 2,540,977 | Arnold | Feb. 6, 1951 |
| 2,651,665 | Booker | Sept. 8, 1953 |
| 2,672,487 | Tegge et al. | Mar. 16, 1954 |